(12) United States Patent
Wahlers et al.

(10) Patent No.: US 8,459,745 B2
(45) Date of Patent: Jun. 11, 2013

(54) BACKREST OF A MOTOR VEHICLE SEAT

(75) Inventors: Christoph Wahlers, Elterlein (DE); Dieter Jungert, Weissach (DE); Tassilo Gilbert, Pforzheim (DE); Thomas Heger, Lorch-Waldhausen (DE)

(73) Assignee: Dr. Ing. H.C.F. Porsche Aktiengesellschaft (DE)

( * ) Notice: Subject to any disclaimer, the term of this patent is extended or adjusted under 35 U.S.C. 154(b) by 0 days.

(21) Appl. No.: 13/271,582

(22) Filed: Oct. 12, 2011

(65) Prior Publication Data

US 2012/0098315 A1    Apr. 26, 2012

(30) Foreign Application Priority Data

Oct. 20, 2010   (DE) .......................... 10 2010 060 076

(51) Int. Cl.
*B60N 2/48*   (2006.01)

(52) U.S. Cl.
USPC ......................................................... 297/410

(58) Field of Classification Search
USPC ......................................... 297/410, 391, 396
See application file for complete search history.

(56) References Cited

U.S. PATENT DOCUMENTS

| 3,507,538 | A | * | 4/1970 | Stoller ........................... 297/410 |
| 4,466,663 | A | | 8/1984 | Oishi et al. |
| 4,515,406 | A | * | 5/1985 | Fujiyama et al. ............. 297/409 |
| 5,222,784 | A | | 6/1993 | Hamelin |
| 5,695,251 | A | * | 12/1997 | Scolari ........................... 297/408 |
| 6,447,062 | B1 | | 9/2002 | Jackel et al. |
| 6,899,395 | B2 | * | 5/2005 | Yetukuri et al. ............. 297/408 |
| 7,755,233 | B2 | | 7/2010 | Reimann et al. |
| 2001/0028191 | A1 | * | 10/2001 | Lance ........................... 297/410 |
| 2003/0111890 | A1 | * | 6/2003 | Zimmermann ............... 297/410 |
| 2006/0226689 | A1 | * | 10/2006 | Linnenbrink et al. ........ 297/408 |
| 2011/0101738 | A1 | * | 5/2011 | Jensen ............................ 297/61 |

FOREIGN PATENT DOCUMENTS

| DE | 32 23 649 | 1/1983 |
| DE | 32 00 321 | 7/1983 |
| DE | 691 12 958 | 4/1996 |
| DE | 199 25 306 | 12/2000 |
| DE | 10 2004 014 420 | 10/2005 |
| DE | 10 2008 036 644 | 4/2009 |
| DE | 20 2009 013 635 | 2/2010 |

* cited by examiner

*Primary Examiner* — Milton Nelson, Jr.
(74) *Attorney, Agent, or Firm* — Gerald E. Hespos; Michael J. Porco; Matthew T. Hespos

(57) ABSTRACT

A backrest of a motor vehicle seat (1) has a head restraint (4) that can be adjusted in height with the aid of a guide. To reduce the production costs of the backrest, the guide for the height adjustment of the head restraint (4) is integrated in the head restraint (4).

9 Claims, 2 Drawing Sheets

BACKREST OF A MOTOR VEHICLE SEAT

CROSS REFERENCE TO RELATED APPLICATION

This application claims priority under 35 USC 119 to German Patent Application No. 10 2010 060 076.8, filed on Oct. 20, 2010, the entire disclosure of which is incorporated herein by reference.

BACKGROUND OF THE INVENTION

1. Field of the Invention

The invention relates to a backrest of a motor vehicle seat, with a head restraint that can be adjusted in height with the aid of a guide.

2. Description of the Related Art

German patent DE 199 25 306 C2 discloses a backrest of a motor vehicle seat with two vertical, lateral, undivided, fixed backrest regions and a central backrest region therebetween. The upper section of the backrest is a head restraint that is guided for movement in height. German laid-open application DE 10 2004 014 420 A1 discloses a motor vehicle seat with a seat understructure in the form of a tubular frame that bears at least one backrest part and a head restraint.

It is an object of the invention to provide a backrest of a motor vehicle seat, with a head restraint that can be adjusted in height with the aid of a guide. The backrest should be producible cost-effectively and should have a pleasing appearance.

SUMMARY OF THE INVENTION

The invention relates to a backrest of a motor vehicle seat. The backrest has a head restraint that can be adjusted in height with the aid of a guide that is integrated in the head restraint. Integrated means that the head restraint guide is arranged completely in the head restraint. The optical effect of a head restraint that is integrated in the backrest thus is imparted in a simple manner. The head restraint preferably can be adjusted both in an x-direction and a z-direction of a motor vehicle equipped with the motor vehicle seat.

The head restraint guide may be mounted on a transverse strut that is connected fixedly to the backrest. The transverse strut enables stable support of forces acting on the head restraint during operation. Furthermore, lines can be conducted through the transverse strut into the interior of the head restraint in a simple manner. For this purpose, at least part of the transverse strut preferably is hollow. The transverse strut may be part of a substantially U-shaped bow that emerges from a backrest supporting structure of the backrest. The U-shaped bow can form a substantially rectangular frame with a further U-shaped bow of the backrest supporting structure.

The head restraint may have lateral slots and the transverse strut may extend through the lateral slots into the interior of the head restraint. The lateral slots permit height adjustment movements of the head restraint relative to the transverse strut.

The guide may comprise at least one guide device fastened to the transverse strut. The guide device may comprise at least one guide bore that extends through the transverse strut. The guide device alternatively or additionally may comprise at least one guide body through which the head restraint of the transverse strut is guided in a height-adjustable manner. The guide body may be a guide tube and a guide rod fastened on the inside of the head restraint may be guided through the guide tube.

The guide may comprise two guide rods that are guided through the guide device and are fastened, preferably by their free ends, on the inside of the head restraint. The guide device and the guide rods are not visible from outside the head restraint.

A driving device for height adjustment of the head restraint may be combined with the guide. The driving device may comprise an electric motor and a gearing.

The driving device may comprise at least one control cable. The control cable may be coupled to the motor via the gearing. The control cable advantageously enables the drive with the motor and the gearing to be accommodated in the backrest, and not in the head restraint.

The control cable may be guided from the interior of the head restraint into the interior of the backrest through or the transverse strut of the backrest. Thus, the control cable is concealed from outside the backrest in a simple manner.

A first end of the control cable may be attached to the top of the head restraint and a second end of the control cable may be attached to the bottom. Thus, the ends of the control cable are fastened inside the head restraint.

Deflecting points for the control cable may be arranged in the backrest or the transverse strut of the backrest. Further deflecting points can be arranged in the backrest itself. Thus, the deflecting points are not visible from outside the backrest.

The driving device may comprise at least one adjustable volume between the backrest or the transverse strut of the backrest and a supporting structure inside the head restraint. The adjustable volume may be an air chamber with a variable volume that may be adjusted by supplying or removing air. The distance between the transverse strut and the supporting structure in the head restraint determines the height of the head restraint and can be varied by adjusting the volume.

The transverse strut may be arranged between two adjustable volumes in the interior of the head restraint. More particularly, an upper adjustable volume may be at the top, a lower adjustable volume may be at the bottom and the transverse strut and the supporting structure may be therebetween inside the head restraint.

The driving device may comprise a spindle drive, such as a driving motor, in particular an electric motor.

The spindle drive may comprise a spindle fastened to a part of the head restraint, such as to the supporting structure in the head restraint. Furthermore, the spindle may be a threaded spindle and may extend in the direction of the height to be adjusted, for example in the z-direction.

The spindle drive may comprise a spindle nut that is driven rotatably to adjust the spindle of the head restraint. The spindle nut may be mounted rotatably in the transverse strut. The spindle nut is driven, for example, by a driving motor, in particular an electric motor. The driving motor also may be arranged in the transverse strut. If the driving motor is not arranged in the transverse strut, the driving motor may be coupled to the spindle nut via a flexible shaft. The use of the flexible shaft enables the driving motor to be mounted at a different location in the backrest, for example below the head restraint.

Further advantages, features and details of the invention emerge from the description below in which various exemplary embodiments are described in detail with reference to the drawing.

DETAILED DESCRIPTION OF THE PREFERRED EMBODIMENTS

Figure 1:
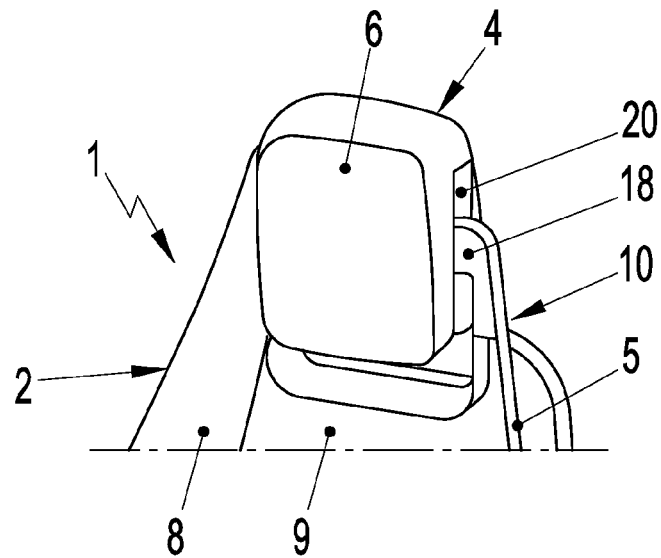
FIG. 1 is a perspective view of an upper section of a backrest according to the invention with a height-adjustable head restraint.
Figure 2:
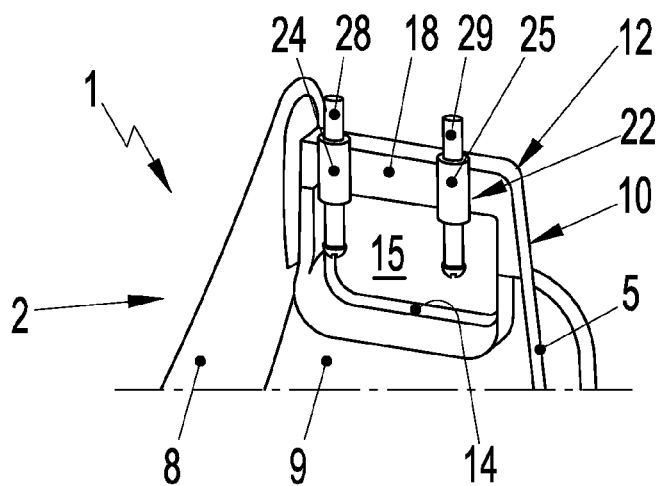
FIG. 2 is a perspective view similar to FIG. 1, but showing the interior of the head restraint.
Figure 3:
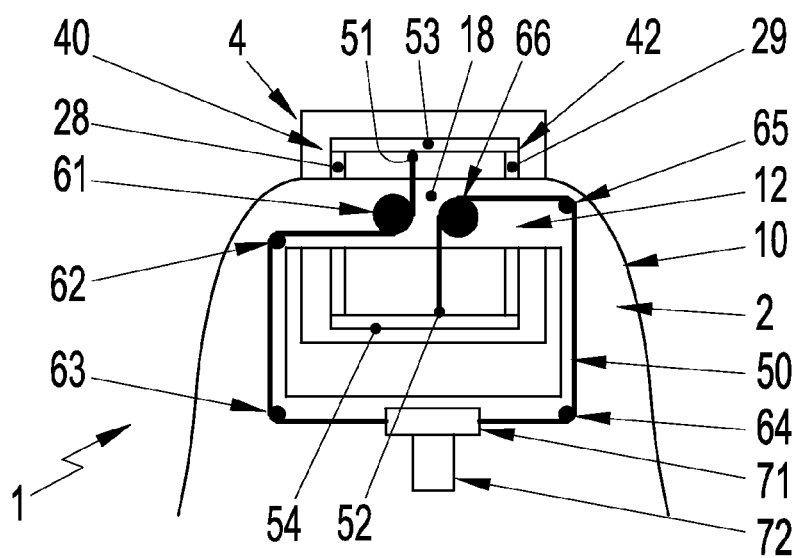
FIG. 3 is a simplified schematic illustration of the guide with a driving device for the height adjustment of the head restraint.

FIGS. 1 to 3 illustrate part of a vehicle seat 1 at the upper end of a backrest 2 in various views. A head restraint 4 is mounted in a height-adjustable manner on the backrest 2. The head restraint 4 preferably also is adjustable in a longitudinal direction of the vehicle, which is referred to as the x-direction.

The backrest 2 comprises a backrest support 5 that is padded with cushion parts 8, 9. In a similar manner, the head restraint 4 is padded with upholstery 6. FIG. 2 does not illustrate the upholstery 6 of the head restraint 4 so as to make the structure of the head restraint 4 located below the upholstery visible.

A supporting structure 10 with a substantially U-shaped bow 12 emerges from the backrest support 5, as shown in FIG. 2. A further substantially U-shaped bow 14 is integrated in the supporting structure 10 or the backrest support 5 so that the bows 12, 14 bound a substantially rectangular clearance 15.

The bow 12 comprises a transverse strut 18 at the upper end of the backrest 2. The transverse strut 18 is connected fixedly to the backrest support 5 via the supporting structure 10 and extends in a transverse direction of the motor vehicle, which also is referred to as the y-direction.

As shown in FIG. 1, the transverse strut 18 extends through a slot 20 into the interior of the head restraint 4. An analogous slot is provided on the opposite side of the head restraint 4. Thus, the cushion part 8 conceals the transverse strut 18 on the outside.

Height adjustment of the head restraint 4 is made possible by a guide device 22 that comprises two guide tubes 24, 25. The two guide tubes 24, 25 are connected fixedly to the transverse strut 18, for example, by welding.

Guide rods 28, 29 are guided in a height-adjustable manner in the guide tubes 24, 25, i.e. are movable in the z-direction of the vehicle. Ends of the guide rods 28, 29 are fastened on the inside of the head restraint 4.

As shown in FIG. 3, the guide rods 28, 29 are fastened to a frame 40 that constitutes a supporting structure 42 in the interior of the head restraint 4. A control cable 50 is provided for adjusting the height of the head restraint 4. A first end 51 of the control cable 50 is fastened at the top to an upper transverse support 53 of the supporting structure 42 of the head restraint 4. A second end 52 of the control cable 50 is fastened to a lower transverse support 54 of the supporting structure 42 of the head restraint 4.

Deflecting points 61 to 66 for the control cable 50 are arranged in the interior of the backrest 2. More particularly, the deflecting points 61 and 66 are arranged within the head restraint 4 in the transverse strut 18 of the backrest 2, while the remaining deflecting points 62 to 65 are arranged outside the head restraint 4 in the supporting structure 10 of the backrest 2. The control cable 50 is driven by a motor 72 via a gearing 71.

The direct support of the head restraint 4 on the fixed supporting structure 10 of the backrest 2 relieves the guide rods 28, 29 of load. Thus, the guide rods 28, 29 can be thinner, more cost-effective and lighter than in conventional head restraints.

Forces on the head restraint 4 are introduced into the supporting structure 10 of the backrest by the guide rods 28, 29 via the guide tubes 24, 25 and the transverse strut 18. The guide rods 28, 29 define lever arms upon application of a load to the head restraint 4. However, the guide tubes 24, 25 significantly reduce the lever forces on the guide rods 28, 29.

The control cable 50 enables the motor 72 and the gearing 71 to be accommodated in a simple manner away from the head restraint 4 at any location in the backrest. Locating the driving motor 72 away from the head restraint achieves acoustic advantages.

The control cable 50 is guided from the interior of the head restraint 4 through the transverse strut 18 and the supporting structure 10 into the interior of the backrest 4. This affords the advantage of creating the overall visual impression of a head restraint 4 which is integrated in the backrest 2.

Lines other than the control cable 50 also can be guided through the supporting structure 10 with the transverse strut 18 into the interior of the head restraint 4, for example, to provide a neck heating system.

The head restraint 4 is pulled up or down when the control cable 50 is moved by the motor 72 via the gearing 71. The gearing can be self-locking to fix head restraint 4 at different heights via self-locking of the gearing 71 without additional latching devices.

Figure 4:
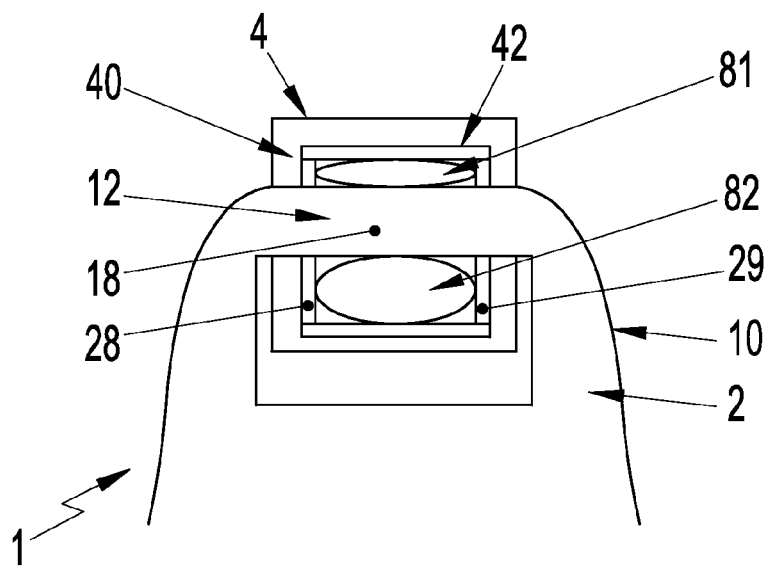
FIG. 4 is similar to FIG. 3, but has a driving device with two adjustable volumes.
Figure 5:
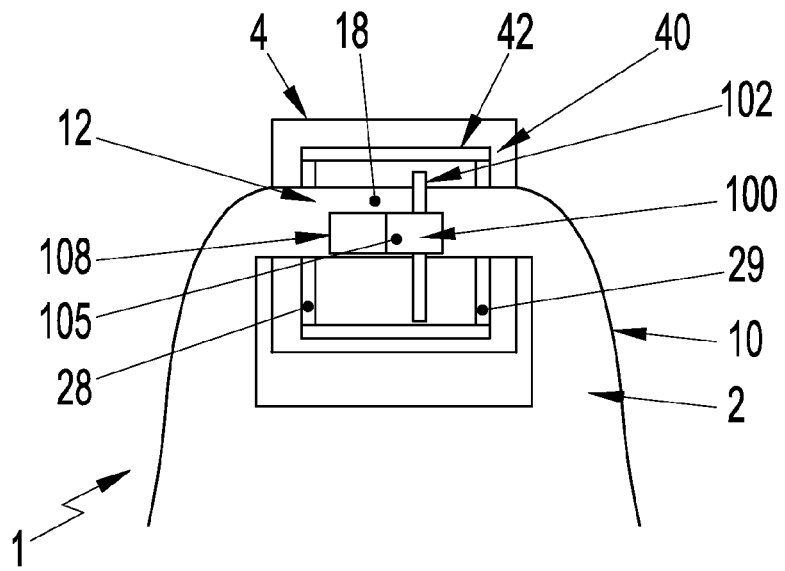
FIG. 5 is similar to FIG. 3, but has a driving device with a spindle drive.

FIGS. 4 and 5 illustrate embodiments similar to FIG. 3, but with different driving devices. The guide rods 28, 29 guide the head restraint 4 in a height-adjustable manner relative to the backrest 2, as in FIG. 3, and are fastened to the frame 40, which constitutes the supporting structure 42 in the head restraint 4.

The driving device for the height adjustment of the head restraint 4 of FIG. 4 comprises two adjustable volumes 81, 82, such upper and lower air chambers having variable volumes. The upper adjustable air chamber 81 is arranged at the top between the transverse strut 18 and the supporting structure 42 of the head restraint 4. The lower adjustable air chamber 82 is arranged at the bottom between the transverse strut 18 and the supporting structure 42 of the head restraint 4.

The air chambers 81, 82 can be inflated and emptied to adjust the height of the head restraint 4. The adjustable volumes 81, 82 are inflated and emptied via valves. Compressed air for inflating the adjustable volumes 81, 82 is supplied, for example, by a pneumatic pump and preferably a pneumatic pump that is already present. This has the advantage of not requiring a separate drive for the height adjustment of the head restraint.

The driving device of FIG. 5 comprises a spindle drive 100 with a spindle 102 and a spindle nut 105. The spindle nut 105 is mounted rotatably in the crosspiece 18 of the backrest 2 and is driven by a driving motor 108. The spindle 102 is a threaded spindle that is fastened at the lower end to the supporting structure 42 of the head restraint 4.

The spindle 102, and therefore the head restraint 4, is adjusted up or down by rotation of the spindle nut 105. The spindle 102 advantageously is subjected only to a tensile stress to prevent undesirable buckling. Blocking of the head restraint 4 at various heights is enabled by self-locking in the spindle drive 100.

What is claimed is:

1. A backrest of a motor vehicle seat, comprising: a transverse strut that is connected fixedly to the backrest; at least one guide device fastened to the transverse strut; a head restraint having lateral slots for accommodating the transverse strut, at least one guide that is integrated in the head restraint and guided along the guide devices and a driving device combined with the guide and operative for adjusting the height of the head restraint, the driving device comprising at least one control cable.

2. The backrest of claim 1, wherein the control cable is guided from the interior of the head restraint into the interior of the backrest through the transverse strut of the backrest.

3. The backrest of claim 1, wherein a first end of the control cable is attached to a top of the head restraint and a second end of the control cable is attached to the bottom of the head restraint.

4. The backrest of claim 1, wherein deflecting points for the control cable are arranged at the transverse strut of the backrest.

5. The backrest of claim 1, wherein the at least one guide device comprises two guide devices fastened to the transverse strut, the head restraint guide further comprising two guide rods fastened on the inside of the head restraint and guided respectively through the guide devices.

6. A backrest of a motor vehicle seat, comprising:
a transverse strut that is connected fixedly to the backrest; a head restraint having lateral slots for accommodating the transverse strut; and a driving device operative for adjusting the height of the head restraint, wherein the driving device comprises an upper inflatable chamber arranged between the transverse strut of the backrest and an upper supporting structure in the head restraint and a lower inflatable chamber arranged between the transverse strut of the backrest and a lower supporting structure in the head restraint, the upper and lower inflatable chambers being alternately and controllably inflated and deflated for adjusting the height of the head restraint.

7. A backrest of a motor vehicle seat, comprising: a transverse strut that is connected fixedly to the backrest; a head restraint having lateral slots accommodating the transverse strut and permitting height adjusting movement of the head restraint relative to the backrest, and a driving device for adjusting the height of the head restraint relative to the backrest, wherein the driving device comprises a spindle drive fastened to the transverse strut and a spindle fastened to the head restraint, the spindle drive including a nut that is driven rotatably and that is engaged with the spindle so that driven rotation of the spindle nut generates a guided height adjusting movement of both the spindle and the head restraint to which the spindle is attached.

8. The backrest of claim 7, wherein the spindle is fastened to a location on the head restraint below the spindle drive so that a downward force on the head restraint generates a tensile force on the spindle and avoids buckling of the spindle.

9. The backrest of claim 8, wherein the spindle drive further comprises a spindle nut that is driven rotatably to adjust the spindle with the head restraint.

\* \* \* \* \*